Sept. 15, 1936.   P. K. SAUNDERS   2,054,340
DIAPHRAGM VALVE
Filed Nov. 28, 1932
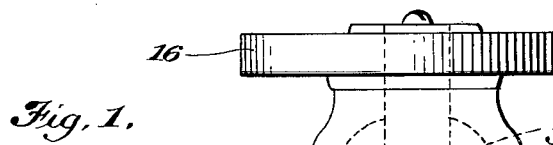
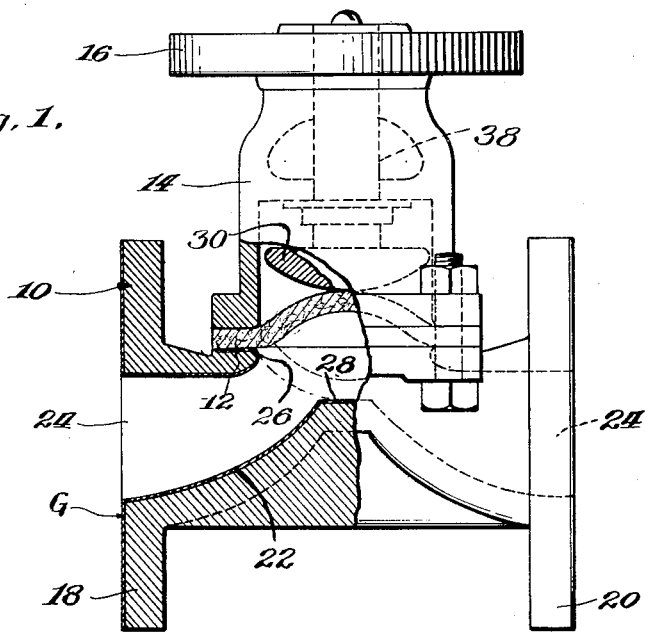
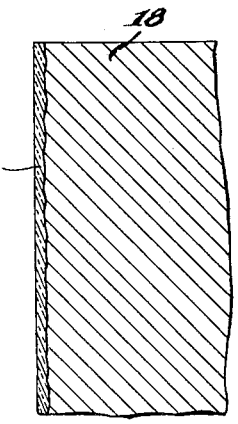
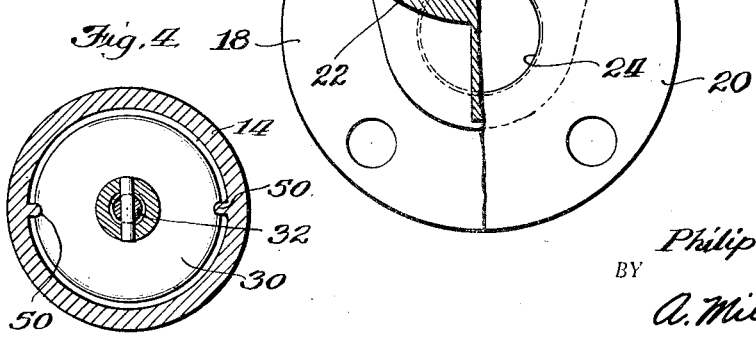
INVENTOR.
Philip K. Saunders
BY
A. Miller Belfield
ATTORNEY.

Patented Sept. 15, 1936

2,054,340

UNITED STATES PATENT OFFICE 2,054,340

DIAPHRAGM VALVE

Philip Keith Saunders, Montreal, Quebec, Canada

Application November 28, 1932, Serial No. 644,641

4 Claims. (Cl. 251—24)

My invention relates to valves and like devices and particularly to diaphragm valves of the streamline type, by which is meant a valve with a relatively straight-through passage or bore into which a diaphragm or other closing device is projected to open and close the valve.

One of the objects of the present invention is to provide a simple and advantageous structure of valve of the kind indicated.

Another object of the invention is to provide a valve of this kind capable of effective and efficient opening and closing and yet simplified and reduced in expense by the elimination of certain parts ordinarily employed in valves of this kind; as, for example, the members for backing the diaphragm when it is in an open condition.

A further object is to provide a simplified construction of diaphragm and bonnet particularly well adapted to secure the next preceding object.

A further object of the present invention is to provide in a valve of this type an interior wall surface which is so constructed that an extremely smooth and slippery surface is provided, thereby reducing the friction in the valve to a minimum.

A further object of the invention is to provide in a valve structure of this type a valve body lined with a vitreous material resistant to chemical and other actions.

A further object is to provide in a valve structure of this type a valve body having its inner surface coated with a thin layer of smoothly finished glass or enamel.

A further object of the invention is to provide improved means for the simple and direct actuation of the diaphragm valve member by an actuating member positioned above it.

A further object is to provide means for lubricating the working parts of the valve.

Other objects and advantages will be more apparent from the following description wherein reference is had to the accompanying sheet of drawings in which Fig. 1 is a side elevational view of a valve embodying my present invention, with a portion thereof broken away in section for convenience of illustration;

Fig. 2 is a front elevational view thereof with a portion broken away to more clearly show other parts;

Fig. 3 is an enlarged fragmentary view of a portion of the valve body showing the lining material which has been fused thereto; and Fig. 4 is a transverse sectional view taken on the line 4—4 of Fig. 2.

Referring to the drawing generally, in Fig. 1, I have shown a valve comprising a valve body or casing 10, the diaphragm 12, the bonnet 14 and the diaphragm operating handle 16.

The valve body 10 may have the end flanges 18 and 20 and a longitudinally extending bore or passageway 22 whose ends 24 terminate at the opposite ends of the housing 10. This bore or passageway 22 is a relatively straight-through bore producing what is known as a streamline valve and is designed to be as straight as possible so that the flow of liquid or fluid passing therethrough may be affected or deflected as little as possible.

The diaphragm 12 is positioned above a central vertical opening 26 in the valve body and is adapted to be constructed of suitable flexible material so that the same may be flexed to a closing position against the shoulder 28 or assume the open position shown in the drawing. The diaphragm is adapted to be actuated to close the valve by means of a plunger including a backing member 30 pivotally mounted upon the end of a stem 32 which extends upwardly through bonnet 14 to the hand wheel 16. The connection between the stem 32 and the backing member 30 is preferably such that the backing member can move sufficiently to align itself with the shoulder 28, even if the construction of the valve is inaccurate.

The stem 32 is provided with a suitable thread 34 that engages in a suitable tapped opening 36 in a collar member 38 that is secured to the hand wheel 16 by means of the key 40. The member 38 is journalled in a vertical bore 39 in bonnet 14 and is provided at its lower end with an enlarged shoulder portion 42 which bears against the lower edge 44 of a horizontal wall in the bonnet 14.

The hand wheel 16 has a portion 46 adapted to abut an upper shoulder 48 of the bonnet 14 so that the collar is effectively secured in a fixed horizontal position and its only movement may be in a rotary direction. By this arrangement, when the hand wheel 16 is turned to open or close the valve, the backing plate 30 will be moved upwardly and downwardly in a straight line thereby flexing the diaphragm 12 into an opposite position from that shown in the drawing and effectively closing the valve or backing away therefrom, thereby removing the support therefor and allowing the pressure of fluid passing through the valve to open the same. Rotary movement of the backing plate 30 is prevented by means of vertical ribs 50 upon opposite walls of the bonnet 14 which lie in suitable grooves in the backing plate and thereby prevent rotation thereof.

From the foregoing it will be apparent that separate or additional backing members, sometimes provided in valves of this kind, are dispensed with, with consequent gain in simplicity and reduction in expense of manufacture, and at the same time the valve will operate effectively and efficiently and may be bowed to opening and closing positions and there held without such additional backing member. Preferably the diaphragm is flexed to substantially the same or like bowed condition in an open and closed position, thereby securing the maximum efficiency because when the valve is open the maximum flow is obtained due to the smoothness of the stream-like curve provided, and because, for a given stress in the diaphragm a maximum aperture is obtained by flexing equally in both directions. Further, by flexing the diaphragm an equal distance in both open and closed positions, there will be no uneven strain or wear upon the same, with the result that the diaphragm will last much longer than the ordinary diaphragm of the same type. In case the diaphragm, in a wide-open position, contacts with the plunger, it will appear that said diaphragm is backed only at the weakest point therein; that is, adjacent the center thereof. However, it can be seen that by short further movement of the backing member 30, no backing whatsoever is afforded to the diaphragm and the same is supported only around its peripheral edge.

The means for providing a smooth and slippery interior finish to the body member may comprise a thin layer of vitreous material G, such as glass or enamel, which is arranged to be fused over the interior surface thereof. This layer of glass or enamel, as seen in the enlarged view thereof in Fig. 3, covers the more or less irregular surface configuration of the housing casing with a smooth unbroken surface, and in this way provides a much more efficient valve and one which will not affect the flow of fluid in any way or cause any hindrance or disturbance to its passage, or have any reaction with chemicals.

While I have shown and described a specific embodiment of my invention, it will be understood that changes and modifications may be made in the exact structure shown and I do not wish to be limited in any detail; rather what I desire to secure and protect by United States Letters Patent is:

1. A diaphragm valve comprising a body having a substantially straight passage intersected between its ends by a shallow weir extending across the width of the passage and upward partway of the depth thereof, said weir being provided with an upper face constituting a seat, the body having an opening above said seat, a diaphragm extending across said opening and co-operating with the seat to open and close the valve, and a plunger to actuate the diaphragm to depress it to cause it to contact with said seat, said plunger being mounted to permit its retraction to allow the diaphragm to bow upwardly and the weir seat being located to permit the diaphragm to contact it to close the valve when said diaphragm is bowed down to an extent substantially equal to the amount it is bowed upwardly when open, the surface of the end of the plunger being a continuous smooth curve of a shape substantially the same as the curvature of the diaphragm in its valve closing position and engaging substantially the entire surface of the diaphragm opposite thereto in its closed position and constituting a backing for the diaphragm in its closed position.

2. A diaphragm valve comprising a body having a substantially straight passage intersected between its ends by a shallow weir extending across the width of the passage and upward partway of the depth thereof, said weir being provided with an upper face constituting a seat, the body having an opening above said seat, a diaphragm extending across said opening and co-operating with the seat to open and close the valve, and a plunger to actuate the diaphragm to depress it to cause it to contact with said seat, said plunger being mounted to permit its retraction to allow the diaphragm to bow upwardly and the weir seat being located to permit the diaphragm to contact it to close the valve when said diaphragm is bowed down to an extent substantially equal to the amount it is bowed upwardly when open, the end of the plunger that engages the diaphragm being a continuous smooth curved surface throughout substantially its entire area.

3. A diaphragm valve comprising a body having a passage intersected between its ends by a shallow weir extending across the width of the passage and upward partway of the depth thereof, said weir being provided with an upper face constituting a seat, the body having an opening above said seat, a diaphragm extending across said opening and co-operating with the seat to open and close the valve, and a plunger to actuate the diaphragm to depress it to cause it to contact with said seat, said plunger being mounted to permit its retraction to allow the diaphragm to bow upwardly and the weir seat being located to permit the diaphragm to contact it to close the valve when said diaphragm is bowed down to an extent substantially equal to the amount it is bowed upwardly when open, said plunger being mounted to permit lateral adjustment of its lower end.

4. A diaphragm valve comprising a body having a passage intersected between its ends by a shallow weir extending across the width of the passage and upward partway of the depth thereof, said weir being provided with an upper face constituting a seat, the body having an opening above said seat, a diaphragm extending across said opening and co-operating with the seat to open and close the valve, and a plunger to actuate the diaphragm to depress it to cause it to contact with said seat, said plunger being mounted to permit its retraction to allow the diaphragm to bow upwardly and the weir seat being located to permit the diaphragm to contact it to close the valve when said diaphragm is bowed down to an extent substantially equal to the amount it is bowed upwardly when open, said plunger being mounted for pivotal movement of its lower end upon a horizontal pivot.

PHILIP KEITH SAUNDERS.